Patented July 28, 1931

1,815,998

UNITED STATES PATENT OFFICE

SAMUEL C. WITHERSPOON, OF EDGEWOOD, MARYLAND, AND ARTHUR F. BEAL, OF WASHINGTON, DISTRICT OF COLUMBIA

WEATHER-PROOF COATING FOR RUBBER

No Drawing.  Application filed December 16, 1929. Serial No. 414,613.

(GRANTED UNDER THE ACT OF MARCH 3, 1883, AS AMENDED APRIL 30, 1928; 370 O. G. 757)

This invention described herein may be manufactured and used by or for the Government for Government purposes, without the payment to us of any royalty thereon.

This invention relates in general to coating compositions and more particularly has reference to a protective coating for rubber.

Previous to this time, it has been well known that if raw or vulcanized rubber is stretched or compressed even slightly and is exposed to the air, particularly under changing climatic conditions, rapid deterioration will follow. This is occasioned by the fact that the ordinary slow deteriorating effect caused by the action of oxygen is enormously accelerated by reason of the exposure of portions of the interior of the body of rubber.

It will be appreciated that any coating or film which will prevent the access of air to rubber will inhibit the deterioration of the same. Prior to this time, however, it has been difficult to provide an impermeable film or coating sufficiently elastic to effectively adhere to rubber which is frequently or continuously subjected to distortion.

An object of this invention is to provide a composition which will afford an effective protective coating for rubber.

Another object of this invention is to provide a composition which may be applied to either raw or vulcanized rubber to afford a protective coating therefor.

Still another object of this invention is to provide a protective coating for rubber which will not crack on or separate therefrom when the rubber is flexed or stretched under ordinary usage.

A further object of this invention is to provide a mixed solvent for dissolving raw rubber and nitrocellulose-like material.

This invention consists in general of dissolving raw rubber and nitrocellulose or cellulose acetate, either alone or in conjunction with either paraffin, a dye or an anti-oxidant or one or more of them, in a mixed solution of the character of any amyl acetate-like liquid and a hydrocarbon having the characteristics of benzene, and applying the resulting composition to rubber goods for protection against the deleterious influences of oxygen and light.

While we have set forth our objects and outlined the essence of our invention, the same consists particularly in the ingredients and proportions to be hereinafter set forth and claimed, with the understanding that the several necessary substances and compounds comprising our invention may be varied within wide proportions and the mixture and application of the same carried out under different conditions, the particular coating specified and manner of application being described as an example of carrying the invention into practical effect without limiting the improvements to the particular restrictions set forth.

We have found that coatings or films derived by dissolving raw rubber and nitrocellulose in a mixture of solvents such as amyl acetate and benzene, when applied to rubber are sufficiently flexible to withstand considerable distortion without cracking and breaking, and that the same is practically impermeable to air. Paraffin wax has been demonstrated to improve the coating composition, and it has also been found that a dye and an anti-oxidant may be added to advantage. Nitrocellulose and raw rubber may be brought into the solution by hexaline or hexaline acetate, but an insufficient amount in solution is obtained to make it of practical use.

In practicing our invention, we have found that a desirable manner of obtaining a suitable solution consists essentially of dissolving paraffin wax in rubber cement by warming to approximately 50° C., and adding nitrocellulose lacquer. The proportion of the solvent mixture may then be aded with continuous stirring until a clear solution results. If a dye or anti-oxidant, or both, is deemed desirable, this is preferably added to the final solution. Particular advantages of this coating over certain other coatings containing rubber and carbon black in suspension along with other ingredients is particularly that the solid colors are all in solution and that the coating may be made practically colorless or of any desired color by the addition of a suitable dye.

It will be manifest that a solution of this kind has the distinct advantage of producing a true film on the surface of the rubber on which it is applied, which feature is lacking in the application of a coating containing materials in suspension.

As examples of the materials contained in our solution, we have mixed approximately 42% of raw rubber, 28% of nitrocellulose, 30% of paraffin wax, and dissolved the same in a mixture of approximately 40% of amyl acetate and 60% benzene to a concentration of approximately 6.4% of solids. Other proportions of the same solid ingredients can be used, as for instance 6% of raw rubber, 10% of nitrocellulose and 84% of paraffin wax dissolved in the same proportions of benzene and amyl acetate to form a concentration of approximately 8% of solids.

It has been found, however, that the decrease in amount of raw rubber and nitrocellulose and the addition of paraffin over certain limits does not afford as efficient protection to the rubber and is not as flexible or elastic. The addition of small amounts of commercial anti-oxidants and dyes to the solution increases the protective qualities of the coating to some extent. If these materials are added, with reference to the proportions mentioned in the first solution, 40% of raw rubber will be used and 1% each of the anti-oxidant and dye, or either may be employed alone, increasing the percentage of the rubber by one percent. These percentages may, of course, be varied to suit the particular requirements. Such antioxidants as stabilite may be employed, and dyes, for instance, of the character of soudan red used.

Concentrations of these solutions as well as 4% of solids may be used, but the maximum concentration obtainable with such solids as amyl acetate and benzene mixtures is approximately 10%. When higher concentrations are attempted, either one or the other of the ingredients precipitates from the solution.

The coating may be applied either by brushing or by dipping the rubber to be treated in the solution. Various types of vulcanized rubber treated with four applications of the preferred solution by means of a brush and by dipping and allowed to stand for twenty-four hours till the coating was thoroughly dry have been bent double and stretched approximately 5% and exposed to the weather in this condition. Such samples were found to withstand deterioration from four to twenty times as long as controlled samples exposed under the same conditions.

There is accomplished by this invention a coating composition for rubber for protection against the deteriorating action of light and oxygen which may be easily applied either colorless or of a suitable color, which is sufficiently flexible to withstand considerable distortion without cracking or breaking.

While we have described the preferred embodiment of our invention, we wish it to be understood that we do not confine ourselves to the precise steps or ingredients herein set forth, by way of explanation, as it is apparent that many changes and variations may be made therein by those skilled in the art without departing from the spirit of the invention, or exceeding the scope of the appended claims.

We claim:

1. A protective coating composition for rubber comprising approximately 42% raw rubber, 28% nitrocellulose and 30% paraffin dissolved in a suitable solvent.

2. A protective coating composition for rubber comprising approximately 42% raw rubber, 28% nitrocellulose and 30% paraffin dissolved in a mixed solution of amyl acetate and benzene.

3. A protective coating composition for rubber comprising approximately 42% raw rubber, 28% nitrocellulose and 30% paraffin dissolved in a mixed solution consisting of approximately 40% amyl acetate and 60% benzene.

4. A protective coating composition for rubber comprising approximately 40% raw rubber, 28% nitrocellulose, 30% paraffin, 1% dye and 1% anti-oxidant, dissolved in a mixed solution consisting of approximately 40% amyl acetate and 60% benzene.

5. A protective coating composition for rubber comprising a quantity of nitro-cellulose, a larger quantity of paraffin, a still larger quantity of raw rubber, and a small amount of a dye and an anti-oxidant, said materials being dissolved in a solvent formed of amyl acetate and benzine.

In testimony whereof we affix our signatures.

SAMUEL C. WITHERSPOON.
ARTHUR F. BEAL.